United States Patent [19]
Schaffer

[11] Patent Number: 5,213,163
[45] Date of Patent: May 25, 1993

[54] HOT-ATTACHED SEMIRIGID GLUE-ON HORSESHOE

[76] Inventor: Allan B. Schaffer, 4751 Del Moreno Dr., Woodland Hills, Calif. 91364

[21] Appl. No.: 828,493

[22] Filed: Jan. 30, 1992

Related U.S. Application Data

[63] Continuation-in-part of Ser. No. 684,805, Apr. 15, 1991, abandoned.

[51] Int. Cl.[5] .......................... A01L 3/00; A01L 5/00
[52] U.S. Cl. ................................ 168/4; 168/DIG. 1
[58] Field of Search ........... 168/4, 20, 31, 42, DIG. 1

[56] References Cited

U.S. PATENT DOCUMENTS

| | | | |
|---|---|---|---|
| 1,187,332 | 6/1916 | Keller et al. | 168/31 |
| 3,476,190 | 11/1969 | Jenny et al. | 168/4 |
| 4,116,278 | 9/1978 | Spencer | 168/4 |
| 4,265,314 | 5/1981 | Tovim | 168/4 |

FOREIGN PATENT DOCUMENTS 2526630  11/1983  France ..................... 168/4

*Primary Examiner*—Robert P. Swiatek

[57] ABSTRACT

A horseshoe comprised principally of semihard polyurethane capable of being reversibly heated to about 275° F. for hot-attachment with a gap-filling adhesive in accordance with the process of the author's prior patent. The shoe has an angular cross section with one leg of the angle bonded to the sidewall of the hoof and the other leg to the bottom of the hoof. The upper leg is of sufficient rigidity to make the L-beam cross section of the shoe strong enough to withstand bending moments without the addition of metal strengthening members. The hot shoe is pliably fit to the contour of the individual hoof as it is being bonded; precise fitting is not required because the adhesive is gap-filling. Lateral relative motion between the shoe and the hoof is prevented by an anchoring mechanism into the sulci of the frog. Case hardened steel plates in the toe and heel regions of the shoe provide superior wear resistance. Overall, the horseshoe is light weight, will remain bonded to the hoof under severe conditions, and has wear resistance superior to conventional steel horseshoes.

6 Claims, 1 Drawing Sheet

HOT-ATTACHED SEMIRIGID GLUE-ON HORSESHOE

This is a continuation-in-part of Ser. No. 07/684,805, Apr. 15, 1991, now abandoned.

RELATED DOCUMENTATION

U.S. Pat. No.

| | | | |
|---|---|---|---|
| 3,302,273 | 9/67 | Renkenberger et al | 168/4 |
| 3,603,402 | 9/71 | McDonnell | 168/4 |
| 4,116,278 | 9/78 | Spencer | 168/4 |
| 4,206,811 | 6/80 | Dallmer | 168/4 |
| 4,265,314 | 5/81 | Tovim | 168/4 |
| 4,346,762 | 8/82 | Tovim | 168/4 |
| 4,690,222 | 9/87 | Cameron | 168/4 |
| 4,892,150 | 9/90 | Thoman | 168/4 |
| 4,957,168 | 9/90 | Battista | 168/4 |
| 5,069,289 | 12/91 | Schaffer | 168/4 |

FOREIGN PATENTS

| | | | |
|---|---|---|---|
| 1,405,211 | 7/73 | G.B. (MacGuire-Cooper) | 168/4 |
| 1,517,113 | 3/76 | G.B. (Tovim) | 168/4 |

OTHER

| | |
|---|---|
| Patent Pending | Mustad, Inc. |

BACKGROUND OF THE INVENTION

1. Technical Field

This invention is concerned with the design of a lightweight, durable glue-on horseshoe.

2. Related Art

The evolution of the present day plastic glue-on horseshoe is traceable through the references cited. A glue-on horseshoe is one that is attached to the hoof by means of an adhesive only; that is without the use of nails or screws. As discussed in many of the references, the elimination of nails is a very healthful development for hoofs. The art related to glue-on horseshoes involves adhesives, materials of construction, contours, strengthening means, fitting, resistance to lateral loads, and wear.

The driving factor in the development of the glue-on horseshoe has been finding a satisfactory adhesive. This problem is very difficult, principally for the following reasons: the impact loads produced when the hoof of a running horse strikes the ground are very large (several thousand pounds); both the hoof and the plastic shoe offer surfaces that tend to be difficult for bonding; and the adhesive must set within a minute or so because of horses' impatience. These factors, taken together, preclude the use of many of the common adhesives.

The adhesive utilized in the two principal glue-on shoes presently marketed in the U.S., by Mustad (patent pending) and Cavallo (under Tovim's British Patent No. 1517113 which is a precursor to Tovim's referenced U.S. patents), both use a cyanoacrylate adhesive. Also a cyanoacrylate, or its generic descriptor "quick setting adhesive", is specified in a number of the referenced U.S. patents including Thoman, Tovim, and Battista. The other common adhesives including hot melts, epoxies, acrylics, and urethanes have very little constituency compared to cyanoacrylates, probably because experience has shown that they will not perform satisfactorily.

Cyanoacrylates have a negative feature for horseshoe applications—they have little gap-filling capability. The horseshoe must be designed to accommodate this limitation. Very close-mating surfaces are required. Consequently the shoe parts being glued to the sidewall of the hoof must be flexible so that they can be pressed close against the surface. Also gluing is not effective on the bottom of the hoof because it is too uneven.

The plastic material most often used for horseshoes is polyurethane. It is specified in most recent patents and is used in both of the commercially available horseshoes previously cited. Polyurethanes can be grouped into three general categories: foamed; flexible (characterized by hardnesses on the Shore A scale); and semihard (characterized by hardnesses on the Shore D scale). Foamed polyurethanes are too weak for structural use in a horseshoe. Flexible polyurethanes are suitable for horseshoes bonded with cyanoacrylates. Semihard polyurethanes have apparently not heretofore been utilized. An exception to polyurethanes is the recent referenced patent of Battista which specifies a horseshoe molded from polyphenylene sulfide resin.

Virtually all of the horseshoes cited have upward-extending member(s) for attachment to the sidewall of the hoof. The upward-extending members often take the form of a plurality of tabs, per Mustad and Cavallo. The upward-extending member(s) are generally contoured to the local angle of the hoof sidewall, per Mustad, Cavallo, Thoman, Cameron, Tovim, Dallmer, and Renkenberger et al.

The bottom part of a polyurethane horseshoe alone is generally not strong enough to withstand the large bending moments to which it may be subjected. Moreover no added strength is provided by the top part when using cyanoacrylate adhesives, because the upward-extending member(s) must be flexible. To provide the additional strength as well as to aid in fitting, an adjunct metal member is often incorporated into the plastic bottom part of the shoe, per Cameron, Tovim, Dallmer, and MacGuire-Cooper. In the horseshoe marketed by Mustad the adjunct member is actually a standard aluminum shoe either imbedded in, or attached to the polyurethane bottom part.

If the horseshoe contains an adjunct metal member, the shoe is fitted to the generally U-shaped individual hoof by cold forming the metal member, per Cameron, Dallmer, and Mustad. If the shoe is all plastic, it is can be supplied oversized and then trimmed to fit the individual horse, per Tovim, or it can be thermofitted, as per Thoman for his polyurethane horseshoe and Battista for his polyphenylene sulfide resin horseshoe.

Glue-on horseshoes, particularly those without metal strengthening members, need special features to resist the sidewall debonding that can result from lateral relative movement of the shoe with respect to the hoof, as tends to occur, for example, during pivoting. Often a crossbar joining the heels of the shoe is specified per Tovim, Dallmer, McDonnell, and MacGuire-Cooper. However, in practice, crossbars are not very effective in preventing sidewall debonding. Instead of a crossbar, Spencer uses two cantilevered bars extending inward to the sulci with the bars terminating in upward projections shaped by the farrier to fit into the individual sulcus. Thoman solves the problem in a different manner by cutting a ridge along the periphery of the hoof bottom for positive mating into a recess formed in the corresponding part of the shoe.

Virtually all of the cited glue-on horseshoes have the disadvantage that, when used with active horses on hard surfaces like dirt as opposed to soft surfaces like grass, they wear much more rapidly than do conventional steel horseshoes. If the bottom surface of the shoe is plastic, the wear problem is generally severe. The shoes by Cameron, Tovim, Dallmer, and Renkenberger et al and some versions by Thoman and Mustad fall into this category. However other versions by Dallmer, Thoman and Mustad have bottom surfaces of aluminum or even steel. Attaching the metal bottom to the plastic base of the shoe presents a special problem. The commercial version of Dallmer's shoe uses rivets. Mustad claims to have solved the problem of gluing aluminum to polyurethane in the manufacturing process for the racing version of their shoe. Thoman proposes to glue a metal bottom to his plastic shoe after it has been bonded to the hoof; however there is available to the farrier no bonding process that will maintain its integrity for very long under the loads to which the hoof is subjected, and Thoman gives no indication of how to solve this problem. A novel solution to the wear problem was proposed by MacGuire-Cooper wherein he specified the addition of abrasive particles to his plastic shoe in order to increase wear resistance. Unfortunately plastics cannot retain abrasive particles under the loads commonly encountered when the hoof strikes the ground.

The previous discussion has summarized the related art prior to the impact of my new process for bonding a polyurethane horseshoe, titled "Process for Gluing to a Horse's Hoof", U.S. Pat. No. 5,069,289, filed on Jun. 18, 1990. Therein a process is disclosed whereby a secure bond is produced by preheating both the hoof and the polyurethane shoe to about 275° F. prior to applying a selected urethane paste adhesive. The adhesive is gap-filling and sets in about one minute. The present application discloses an optimum horseshoe to exploit the advantages inherent in this bonding process.

SUMMARY OF THE INVENTION

The horseshoe of this invention is constructed of semirigid polyurethane and has a continuous angular cross-section with the base leg mating to the bottom of the hoof and the other leg projecting upward and mating to the side of the hoof. The upward leg is sufficiently rigid to serve effectively as part of an L-beam in withstanding bending moments; therefore no metal strengthening member is needed.

In accordance with my earlier patent on gluing horseshoes, the shoe is preheated to about 275° F. for secure attachment when brought into contact with a paste-type urethane adhesive. The shoe is bonded to both the bottom and side of the hoof. The hot shoe is pliably fit to the contour of the individual hoof during the attachment process. Precise fitting is not needed because of the gap-filling nature of the paste adhesive.

In order to inhibit lateral motion of the shoe, it is anchored into the two sulci of the frog by filling them with the paste adhesive, which in turn is bonded to cantilevered bars that extend inwardly from the shoe body. Superior wear resistance is provided by case hardened steel plates at the toe and heels of the shoe.

The resulting shoe is lightweight, will not debond under extreme loads, is thermally fit to the contour of the individual hoof, and has wear qualities superior to a conventional steel horseshoe.

DESCRIPTION OF THE PREFERRED EMBODIMENT

The object of this invention is a lightweight, long wearing, glue-on horseshoe that capitalizes on the gluing process of my referenced patent, summarized previously. That process requires the horseshoe to be made from a polyurethane reversibly heatable to about 275° F. Both the hoof and shoe are preheated to this temperature prior to bonding with a gap-filling urethane adhesive.

Figure 1:
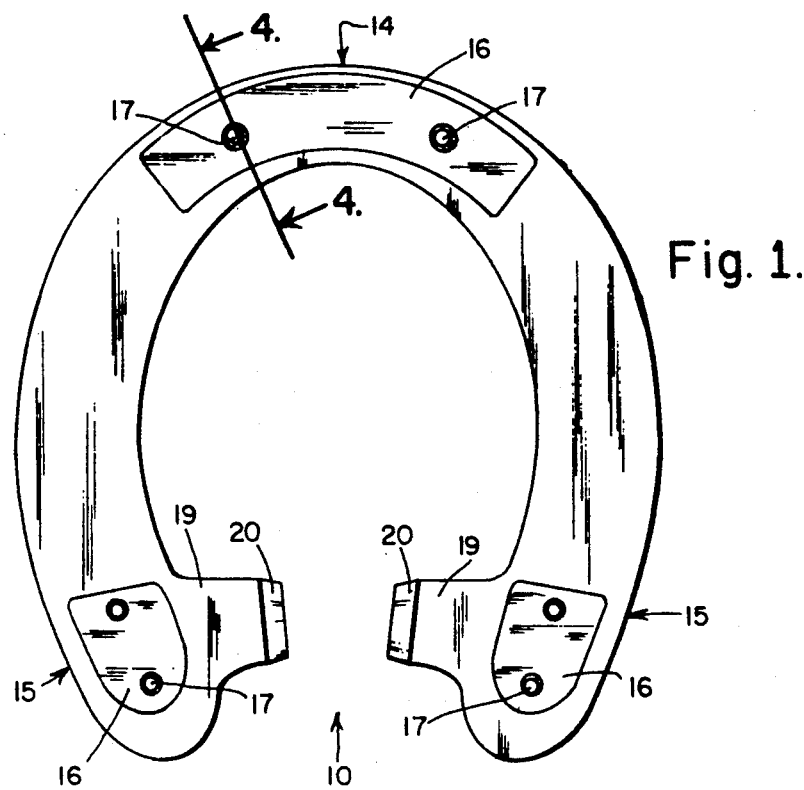
FIG. 1 is bottom plan view of the horseshoe in accordance with the present invention.
Figure 2:
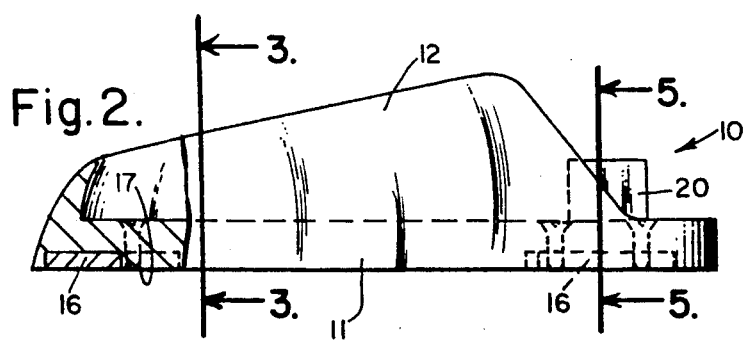
FIG. 2 is a side view of the horseshoe in FIG. 1.

The horseshoe 10 of this invention is shown in FIG. 1 as viewed from the bottom and FIG. 2 as viewed from the side. It has an angular cross-section, shown typically in FIG. 3. The bottom 11 of the shoe, that is, the part that fits under the hoof, comprises the base leg of the angle 13. A rim 12, fitting against the sidewall of the hoof, comprises the other leg. The angle 13 is varied from 50 degrees or so at the toe 14 of the shoe to about 90 degrees at the heels 15 of the shoe so as to match approximately the local angle of the hoof. These features are similar to the referenced patent by Cameron.

The horseshoe is cast, or molded from a semihard polyurethane that has a Shore D hardness of at least 50 and is capable of being reversibly heated to about 275° F. Semihard polyurethanes have greater strength and wear resistance than do the more flexible polyurethanes used in other horseshoes, which typically have a hardness in the 80's to 90's on the Shore A scale. The recommended polyurethane for the horseshoe of this invention is "Uralite 3500" by Hexel. It has a Shore D hardness of 70, tensile strength of 5000 psi, elongation of 175%, and superior resistance to wear.

Figure 3:
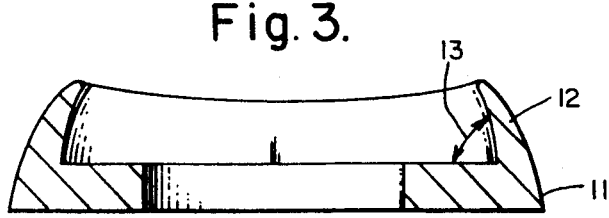
FIG. 3 is a cross-section view of the horseshoe of FIG. 1 taken along lines 3—3.

An important feature of the horseshoe is that the rim 12, which is about ⅛" thick, serves not only for bonding to the sidewall but also as a part of a structural L-beam, FIG. 3, to resist bending moments. No adjunct metal strengthening member is needed. This relatively rigid uni-body construction also has gluing advantages; if a local area of the rim were to debond, the rigidity of the rim allows the load to be transferred to good bonds in adjacent areas.

In contrast, the rims and tabs for sidewall bonding in the prior art are all flexible and therefore cannot provide the advantages described above.

Another desirable feature results from the highly pliable state of the shoe at about 275° F. when it is being hot-attached to the hoof. This pliability gives great latitude in fitting the shoe during the attachment process. The pre-forming necessary with most other horseshoes is obviated. The farrier can readily accommodate substantial variations in the contour of the individual hoof simply by manually shaping the pliable shoe to match the particular hoof as he attaches the shoe with the adhesive. As the shoe cools, the shape becomes permanent. Thoman and Battista have also specified thermofitting, but their processes do involve the additional step of pre-forming the hot shoe prior to fitting, not during the fitting process, because their adhesive will not accommodate the high temperature necessary for thermofitting (cyanoacrylates are typically limited to about 170° F.).

Another feature of the horseshoe is the reduced attachment time, compared to cyanoacrylate bonding, that results from having a single upward-projecting member, namely the rim 12, together with a gap-filling adhesive. Once the hoof and shoe have been brought to temperature, the adhesive is applied in a single step to the appropriate areas of the hoof or to the mating surfaces of the shoe, and then the shoe is attached in another single step. Since the paste adhesive fills large gaps, great care is not necessary in fitting the shoe to the hoof. Moreover the adhesive specified in the gluing process sets in less than a minute, in part because it is in contact with hot surfaces. The entire process is very rapid compared to using a cyanoacrylate for bonding a shoe with multiple tabs, each of which must be sequentially glued with great care. The patent by Cameron bears some similarities to the above described attachment procedure in that he also specifies a single upward-projecting member and an adhesive (epoxy) that in some versions can be gap filling. However epoxies are relatively slow setting and are too brittle for use on horseshoes.

The horseshoe of this application can be effectively bonded to both the bottom and sidewall of the hoof, as opposed to just the sidewall for horseshoes using cyanoacrylates. This increased area for gluing naturally increases the strength of the overall bond between the shoe and hoof.

Resistance to the high lateral loads that cause sidewall debonding is provided in a way much simpler than in the prior art of Spencer and Thoman, both of whom require considerable sculpturing by the farrier. In Spencer's case, parts of his shoe must be pain-stakingly sculptured to fit each sulcus, the shape and location of which vary markedly from horse to horse, and even foot to foot on the same horse. In Thoman's case, the farrier must sculpture the hoof by trimming the entire bottom of the wall so as to leave a ridge about ¼" high by ⅛" wide along its periphery. This ridge fits into a groove in the shoe for positive contact to prevent lateral relative motion.

Figure 5:
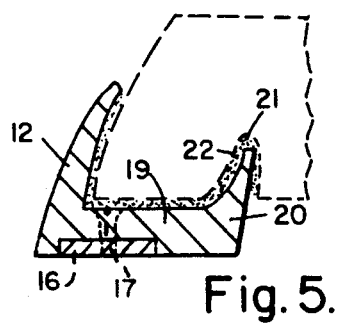
FIG. 5 is a cross-section view taken along lines 5—5 in FIG. 1 showing the horseshoe mounted on the hoof.

In the present invention, positive contact is provided without any sculpturing of either the shoe or the hoof. Similarly to Spencer, use is made of the two sulci 21 in the frog, FIG. 5. The shoe has two cantilevered bars 19 that extend inward and terminate under each sulcus. As part of the gluing process, the sulci are filled with the adhesive 22, which then bonds to the bars 19. Optional tabs 20, rising into the sulci, may also be utilized to strengthen the sulcus anchor. Positive contact between the adhesive 22 when hardened and the walls of the sulcus 21 prevent lateral relative motion between the shoe and the hoof, as is necessary to resist sidewall debonding.

A final advantageous feature of this horseshoe is its resistance to wear. A semihard polyurethane by itself has outstanding wear properties for a plastic. Its wear resistance is generally adequate everywhere but at the toe region 14 and heel regions 15, and for horses that are not heavily worked, or are worked only on grass, the wear resistance of the semihard polyurethane is normally adequate even in these regions. However, for general applications, hardened steel plates 16 are provided in the toe and heel regions, FIG. 1. These are typically stamped from soft steel about ⅛" thick and then case hardened to approximately 60 on the Rockwell scale for a depth of about 0.025" to 0.030". (The term case hardening is used herein to denote the numerous industrial processes that can produce high indepth hardening in steel). Since Rockwell 60 is also the typical hardness of a metal file, it is evident that no appreciable wear will occur in equine applications. In fact the shoes with case hardened steel plates in the toe and heel regions will outwear conventional steel horseshoes, which cannot be similarly hardened because such prehardening is incompatible with the forging normally necessary in fitting the shoe to the hoof.

Figure 4:
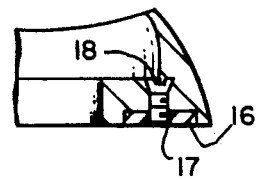
FIG. 4 is a cross-section view of the horseshoe of FIG. 1 taken along lines 4—4.

The steel wear plates 16, anchored by one of several possible methods of attachment, are shown in FIGS. 1, 2, and 4. The plates 16 have threaded holes 17 to accept metal screws 18 inserted from above. The plates with the screws attached are placed in the mold prior to pouring, or injecting, the polyurethane, which in turn encases the screws and anchors the plates. Plates attached in this manner are very secure but cannot be removed without destroying the utility of the shoe. Alternatively metal members with female threads, e.g. nuts, can be imbedded in the shoe and screws used to anchor the plates by engaging the threaded metal members. This latter configuration is advantageous if one desires to switch to or from wear plates that incorporate grabs or caulks.

None of the prior art teaches case hardened wear plates. Some configurations per Mustad and Dallmer have metal shoes attached to the bottom. However since fitting of the shoes to the hoof must be accomplished by forming the metal member, it cannot be case hardened. Thoman proposes gluing a metal wear plate on the bottom of the plastic shoe after thermofitting the shoe to the hoof. Presumably the metal plate must be cut, ground, or filed to fit the final contour of the hoof; therefore it cannot be case hardened in advance. Moreover it is impractical for the farrier to have the plate case hardened after it has been contoured. In addition, Thoman's claim hinges upon an, as yet, unavailable process for field gluing of metal to polyurethane with bonds strong enough to withstand equine loads.

Many of the central features of the horseshoe disclosed herein are made possible by the hard polyurethane material. The strength and rigidity of the material are crucial for the structural effectiveness of both the L-beam cross-section and the cantilevered bars anchoring in the sulci. The abrasion resistance of the material makes it possible to use wear plates only in the toe and heel regions as opposed to covering the whole bottom of the shoe as do Mustad, Dallmer, and Thoman. This configuration in turn allows both case hardening of the wear plates and thermofitting of the shoe.

In summary, the glue-on horseshoe of this invention, together with the bonding process of the my prior patent, offer a combination of advantages not previously available in a single horseshoe. These include light weight, secure bonding to both the bottom and side of the hoof, ability to withstand bending moments without the use of metal strengthening members, thermofitting integrally with the attachment process, expeditious bonding, positive elimination of lateral relative motion between the shoe and the hoof, and superior wear resistance. The particular features found in none of the prior art are L-beam strength, a simple way of anchoring to resist lateral motion, and case hardened wear plates.

I claim:

1. A horseshoe cast or molded from a semirigid polyurethane having hardness in excess of about 50 on the Shore D scale and having a toe region and heel ends,
    said shoe having a continuous angular cross-section wherein the base leg of the angle fits under the hoof and the other leg of the angle projects upward so as to fit against the sidewall of the hoof with said angle varying so as to match approximately the local angle of the hoof, said upward-projecting leg being integrally constructed from said semirigid polyurethane and having a thickness of about ⅛ inch so as to serve as part of an L-beam cross section in resisting bending moments, said shoe being reversibly heated to a temperature of about 275° F. so as to produce a secure bond when brought into contact with a paste-type urethane adhesive, said secure bond applying both to the sidewall and bottom of the hoof, said shoe being sufficiently pliable at said temperature for facile forming during the attachment process so as to match the contour of an individual hoof, and said shoe having two cantilevered flat bars extending inward from each side intermediate the toe region and heel ends and terminating underneath, but below and spaced from, the sulci of the horse's frog so as to provide bonding surfaces for anchors into said sulci, said shoe to be used in conjunction with a paste adhesive that fills said sulci and thereby provides said anchors so as to inhibit relative lateral motion between the shoe and the hoof.

2. The horseshoe of claim 1 wherein case hardened steel wear plates are built into the bottom of the shoe in the toe and heel regions.

3. The horseshoe of claim 1 wherein case hardened steel wear plates are attached to the bottom of the shoe in the toe and heel region by means of screws engaging threaded parts embedded in the shoe.

4. The horseshoe of claim 1 wherein a case hardened steel wear plate built with a grab is attached to the bottom of the shoe in the toe region by means of screws engaging threaded parts embedded in the shoe.

5. The horseshoe of claim 1 wherein case hardened steel wear plates built with caulks are attached to the bottom of the shoe in the heel regions by means of screws engaging threaded parts embedded in the shoe.

6. The horseshoe of claim 1 wherein the cantilevered bars have integral tabs extending upward in a non-contacting relationship into the sulci so as to provide additional bonding surfaces.

* * * * *